United States Patent [19]

Barry

[11] 4,189,992
[45] Feb. 26, 1980

[54] BREAD BAKING

[76] Inventor: John D. A. Barry, 115 Hazelwood Ave., San Francisco, Calif. 94133

[21] Appl. No.: 3,227

[22] Filed: Jan. 15, 1979

[51] Int. Cl.² .............................................. A47J 27/62
[52] U.S. Cl. ...................... 99/327; 99/352; 366/69; 366/91
[58] Field of Search ................ 99/325, 326, 327, 334, 99/335, 348, 349, 352; 366/69, 70, 91, 96; 307/225 B, 225 R, 238, 269; 331/1 A, 14

[56] References Cited

U.S. PATENT DOCUMENTS

| 218,578 | 8/1879 | Rideout | 366/69 |
|---|---|---|---|
| 906,271 | 12/1906 | Palmer | 366/69 X |
| 2,119,455 | 5/1938 | Deayala | 99/327 |
| 2,949,868 | 8/1960 | Ruffinatti | 366/70 |
| 3,271,688 | 9/1966 | Gschwind | 307/269 |
| 3,293,561 | 12/1966 | Hegarty | 307/225 R |
| 3,297,953 | 1/1967 | Colton | 331/1 A |
| 3,395,361 | 7/1968 | Brauer | 331/1 A |
| 3,514,713 | 5/1970 | Leyde | 331/14 |
| 3,555,446 | 1/1971 | Braymer | 331/1 A |
| 3,582,810 | 6/1971 | Gillette | 331/14 |
| 3,681,706 | 8/1972 | Harzer | 331/1 A |
| 3,801,835 | 4/1974 | Tasso | 307/225 B |
| 4,017,802 | 4/1977 | Ferrarin | 307/238 |

FOREIGN PATENT DOCUMENTS 1191313  4/1965  Fed. Rep. of Germany ............. 99/327

*Primary Examiner*—Billy J. Wilhite

[57] ABSTRACT

A bread baking system in which dough is automatically punched down, the rise times of the dough timed, and the oven turned on and off at the proper times.

12 Claims, 4 Drawing Figures

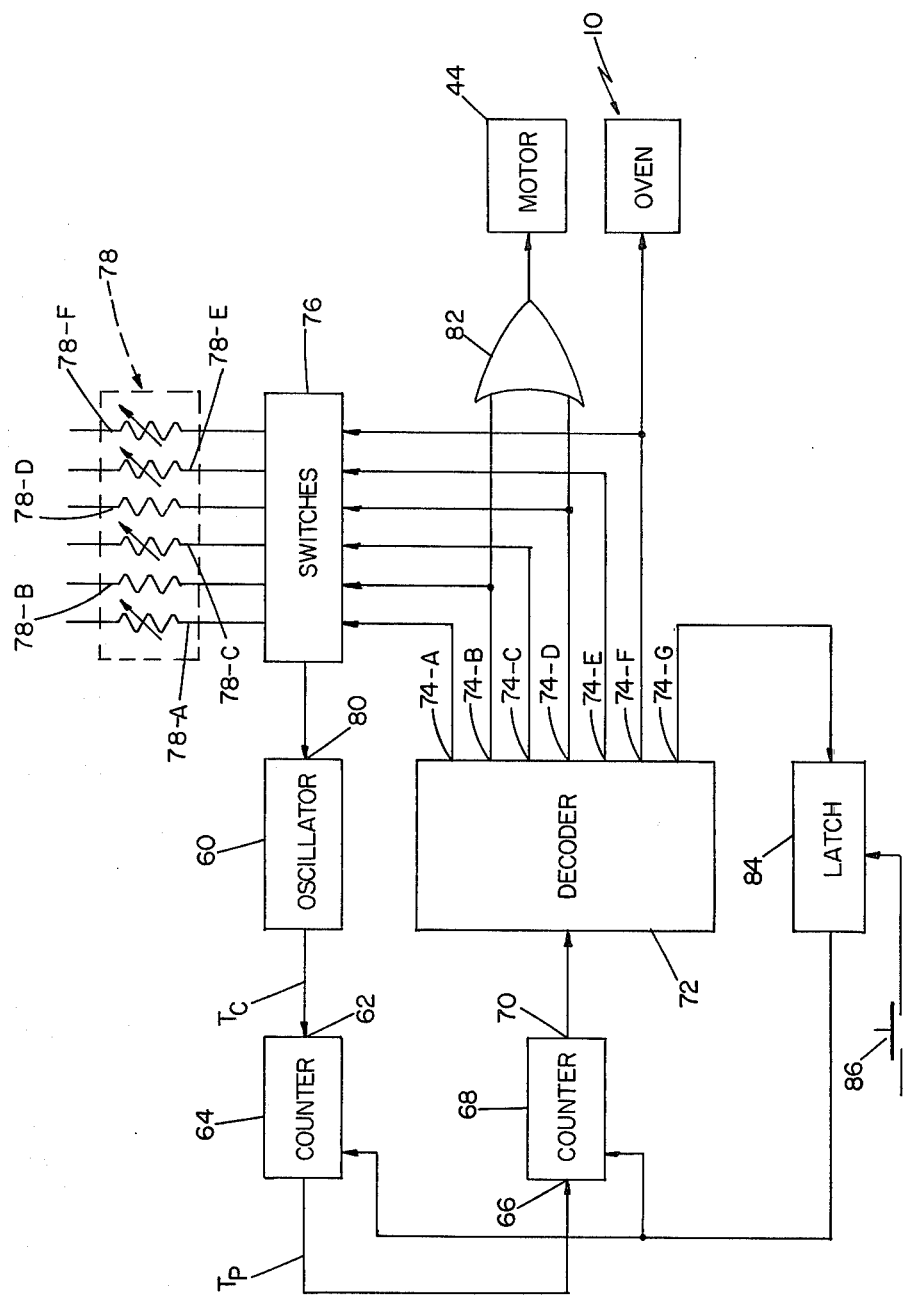

BREAD BAKING

BACKGROUND OF THE INVENTION

This invention relates to bread making and, more particularly, to devices for making bread at home.

Typically, bread dough is allowed to rise three times before baking, and is punched down between the first and second rises and kneaded between the second and third rises. After the third rise, it is baked. The total time required, from the beginning of the first rise until the end of baking, is usually several hours.

SUMMARY OF THE INVENTION

The present invention provides a device that will punch the dough down automatically at the proper times, setting the necessary rise time intervals, and turn the oven on and off at the proper time. The device can be used with even a small table-top oven; may automatically control baking time also; and may permit the various rise and baking times to be varied, even reducing one of the rise time intervals to zero if only two rises are desired.

In the preferred embodiment, a pair of plates are pivoted towards each other at the appropriate times to punch down bread dough between them; and a controller is connected to the oven and to the plate drive to insure that all takes place when desired.

Other objects, features and advantages will appear from the following detailed description of a preferred embodiment of the invention, taken together with the attached drawings in which:

FIG. 4 is a schematic view of portions of the system of FIG. 1.

Figure 1:
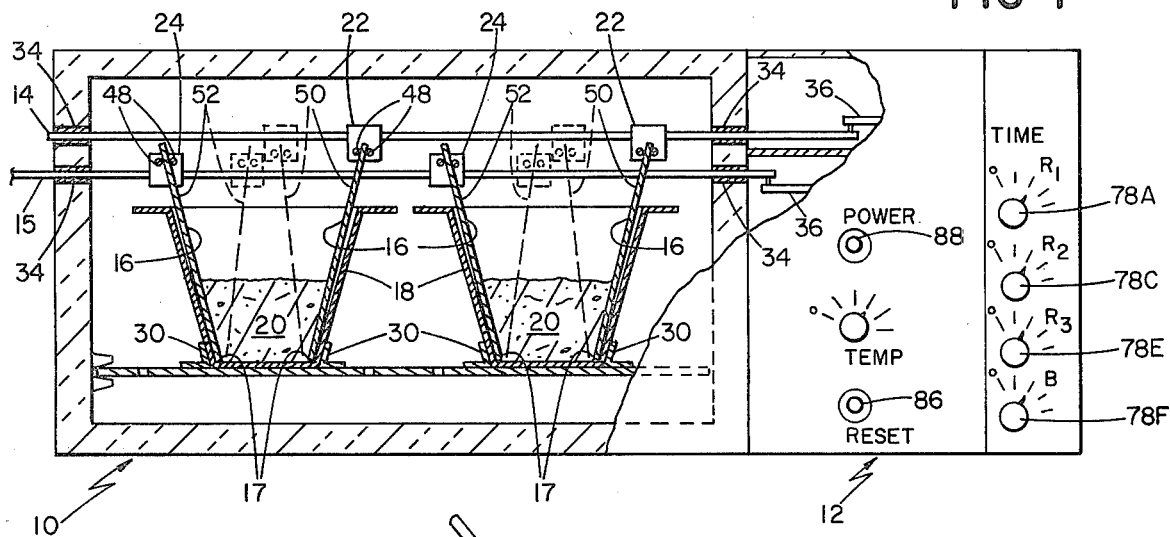
FIG. 1 is a plan view, partially in section, of a baking system embodying the present invention.
Figure 2:
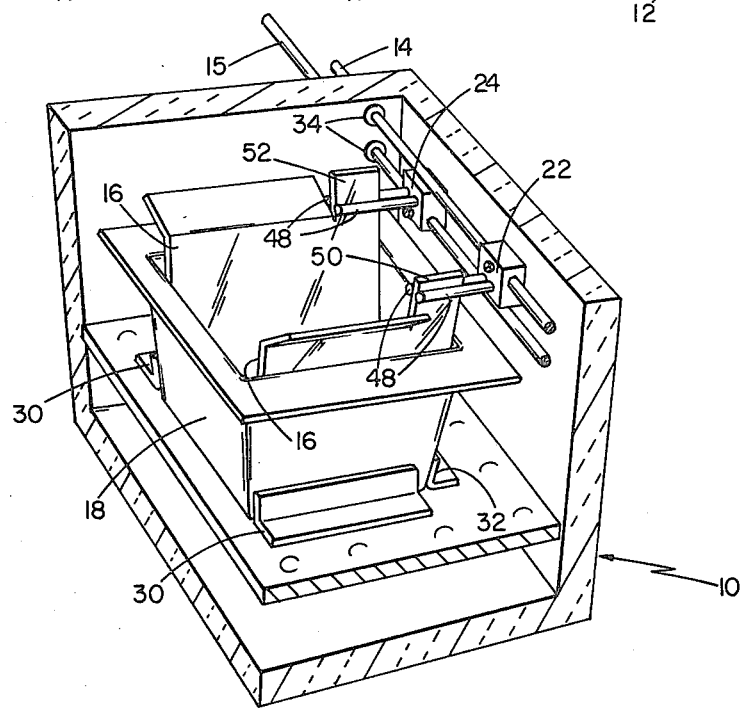
FIGS. 2 and 3 are perspective views, partially in section, of portions of the system of FIG. 1.

Referring now to the drawings, there is shown a bread making system including an electric oven 10, a controller 12, two horizontal control rods 14, 15 and two pairs of generally vertical plates 16. Each pair of plates 16 is placed within, and adjacent the long sides of, a conventional bread pan 18, and the bread dough 20 is between the plates within the pan. Control lugs 22, 24, two on each of control rods 14, 15 (one for each pan 18), engage tabs 50, 52 projecting from plates 16. Spaced parallel guide rails 30, riveted to the bottom of a shelf in oven 10, engage the sides of pans 18 and hold them in place. A third guide rail 32 engages the back ends of pans 18, limiting the extent to which the pans can be pushed into the oven.

Figure 3:
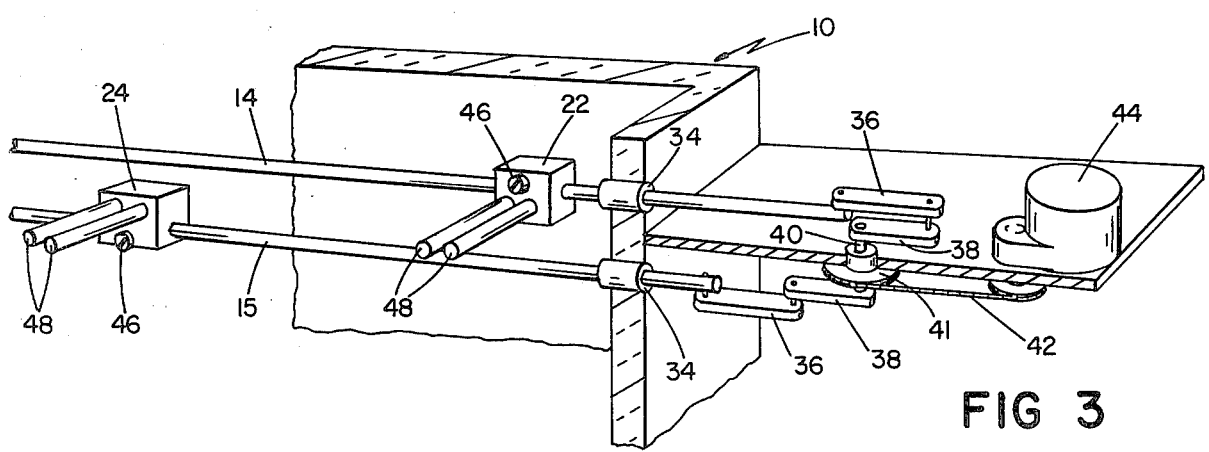

Control rods 14, 15 are mounted in bushings 34 in the ends of oven 10, so that the rods may be moved axially back and forth. The ends of the rods, outside oven 10, are attached by links 36 to drive rods 38 fixed to the opposite ends of a drive shaft 40. As shown, drive rods 38 extend radially outwardly from drive shaft 40, and links 36 are pivotally connected to both drive rods 38 and rods 14, 15. A drive chain 42 extends between a drive sprocket 41 attached to drive shaft 40 between rods 38 and the output shaft of a low rpm electric motor 44. When motor 44 is turned on, it drives sprocket 41, and thus drive shaft 40, at a speed of one rpm, causing control rods 14, 15 to oscillate slowly back and forth. Control rods complete one oscillating cycle, moving from the starting position (shown in FIGS. 1 and 3) to a fully displaced position (shown in dashed lines in FIG. 1) in which sprocket 41 has rotated 180° and then back to the starting position, in one minute. After a complete cycle, lugs 22, 24 hit a limit switch (not shown), turning off motor 44.

Control lugs 22, 24 slide over control rods 14, 15 and are locked in place by set screws 46. A pair of closely spaced fingers 48, extending generally perpendicular to the axis of the respective one of rods 14, 15, project forwardly from the main body of each of lugs 22, 24 and engage tabs 50, 52 projecting upwardly from plates 16. As shown, tabs 50, 52 are projections from the main body of respective ones of plates 16, and are of thicknesses such as to fit loosely between the fingers 48 of respective ones of lugs 22, 24.

As will be evident, movement of rods 14, 15 from the starting position (shown in FIG. 3 and in solid in FIG. 1) to the fully displaced position (shown in dashed lines in FIG. 1), causes plates 16 to pivot together, punching dough 20 down from its risen configuration (shown in solid) into a smaller wad. During such movement, plates 16 pivot generally about their bottom edges 17, although there may be some slippage since the bottoms of the plates are not fixed to pans 18 but are held apart by the dough 20. Tabs 50, 52 move along generally arcuate paths, and the slipfit between the tabs and the fingers 48 of lugs 22, 24 permits the necessary relative movement between the tabs and lugs.

The design of controller 12 is shown schematically in FIG. 4. As shown, it includes a variable frequency oscillator 60, the clock output $T_c$ from which is applied to clock input 62 of fixed length counter 64. Counter 64 counts the $T_c$ clocks and generates output pulse $T_p$ to clock input 66 of counter 68, and resets itself to zero to begin counting anew, when the count reaches a fixed number. The time between $T_p$ pulses is thereby determined by the frequency of $T_c$. Counter 68 counts the $T_p$ pulses and provides the count number on output 70 to decoder 72, which has separate outputs 74 A-G for each possible count number. Only one of outputs 74, that corresponding to the count number on output 70, is active at any time. Outputs 74 are applied to the inputs of switch circuits 76, which selectively connect frequency determining resistors 78 A-G to frequency selection input 80 of oscillator 60, to determine the frequency of $T_c$. Each output 74 therefore determines the time interval during which it will be active (i.e., the width of the pulse on the outputs 74) by controlling the time between the $T_p$ pulses at the start and end of the interval.

In the illustrated embodiment, output 74A is active during the first rise time, output 74C during the second rise time, and output 74E during the third rise time. The length of time during which each of the outputs is active is controlled by variable frequency determining resistors 78A, 78C and 78D respectively. By varying these resistors the length of each rise time may set anywhere in the range of 15 to 150 minutes, or may if desired be set at zero. Since the rise times are merely waiting periods, outputs 74A, 74C and 74E perform no active functions.

Outputs 74B, 74D, 74F, and 74G, on the other hand, activate respective portions of the bread making system. Outputs 74B and 74D are each active for one minute, determined by, respectively, fixed frequency determining resistors 78B and 78D, and are gated together by gate 82 such that either will activate motor 44. Output 74B activates the motor after the first rise time, determined by output 74A; output 74D after the second rise time, determined by output 74C.

Output 74F, the active period of which is determined by variable frequency determining resistors 78F, turns oven 10 on for the desired baking time. At the end of the baking time, i.e., at the end of the active period of output 74F, output 74G turns off the control circuitry, resetting counters 60 and 64 to zero through latch 84.

To begin the cycle, a start button 86 is pushed to provide a start command and release latch 84.

In operation, a user sets the first, second and third rise times (by setting resistors 78A, C and E); the baking time (setting resistor 78F) and the baking temperature; places kneaded dough 20 in pans 18 between plates 16; positions the pans, dough and plates in oven 10 with the tabs 50, 52 of plates 16 between the fingers 48 of respective ones of lugs 20, 24; turns on main power switch 88 and pushes start button 86. After the first rise time, typically in the range of 30-60 minutes, motor 44 is activated thereby to oscillate control rods 14, 15 and punch down the dough. The punching down is repeated after the second rise time; and, after the third rise time, output 74F turns oven 10 on, to bake the dough for the preset time and at the preset temperature.

Other Embodiments

In some circumstances, the user may prefer manually to punch the dough after the second (and before the third) rise time, rather than automatically punching the dough down. Although it does not affect taste, manual kneading generally results in greater volume in the final risen bread loaf. Such manual kneading may simply be accomplished at the proper time using the already described apparatus; or the system may be modified to stop the counters and provide a signal (such as a light or buzzer) after the second rise time; and include a restart button to start the counters for the third rise time and baking after the manual kneading. This and other modified embodiments will be within the scope of the following claims.

What is claimed is:

1. A bread baker including;
  an oven;
  a pair of plates within said oven and arranged to be positioned within a baking pan on opposite sides of a quantity of bread dough within said pan;
  a driver engaging said plates and arranged to move said plates towards and away from each other to squeeze the bread dough between the plates; and,
  a controller coupled with said driver and with means for heating said oven, and arranged to activate said driver to squeeze said bread dough at a first predetermined time following a first predetermined time interval, and to activate a selected one of said driver and said means for heating said oven following a second predetermined time interval subsequent to said first predetermined period of time and time interval.

2. The bread baker of claim 1 wherein said controller is arranged to activate said driver to squeeze said dough at a second predetermined time following said second predetermined time interval and to activate said means for heating said oven after a predetermined time interval subsequent to said first and second predetermined times and time intervals.

3. The bread baker of claim 1 wherein said controller is arranged to activate said means for heating said oven for a predetermined heating period following said second predetermined time interval and then to deactivate said means for heating.

4. The bread baker of claim 1 wherein said controller includes a plurality of interval controls each operative to determine a respective one of said time intervals and adjustable to permit said respective time interval to be varied in length.

5. The bread baker of claim 1 wherein each of said plates is arranged to be positioned generally vertically and parallel to the other of said plates with the lower edges thereof adjacent and parallel to the bottom of said pan, and wherein said driver engages an upper portion of each of said plates and moves said upper portions towards and away from each other thereby pivoting said plates towards and away from each other generally about the lower edges thereof.

6. The bread baker of claim 5 wherein said driver includes a pair of plate engagers, each of said plate engagers defining a recess engaging opposite sides of a said plate upper portion in such a way as to permit relative sliding movement between said recess and said plate upper portion, and said driver being operative to move each of said plate engagers reciprocally back and forth along a line generally perpendicular to the planes of said plates.

7. The bread baker of claim 5 wherein said driver includes a pair of parallel driver rods each mounted generally perpendicular to the planes of said plates for reciprocating axial movement, a plate engager coupling each of said rods with one of said plates, and a motor for moving each of said rods reciprocally.

8. The bread baker of claim 7 wherein said motor moves each of said rods at a speed of about one complete cycle per minute.

9. The bread baker of claim 5 wherein said driver pivots said plates between a first position in which said plates are not relatively converging and both the upper and lower edges of said plates are spaced apart from each other, and a second position in which said plates converge towards each other with the upper edges of said plates more closely adjacent than the lower edges thereof.

10. The bread baker of claim 5 wherein said plates are not attached to said pan.

11. The bread baker of claim 1 wherein each of said predetermined time intervals is in the range of 15 minutes to 150 minutes.

12. The bread baker of claim 2 wherein said controller includes an interval control determining the length of said second predetermined time interval and adjustable to permit said second predetermined time interval to be varied between zero and not less than 30 minutes.

* * * * *